April 27, 1926.

R. B. FAGEOL 1,582,672

VEHICLE SPRING SUPPORT

Filed Sept. 14, 1920

WITNESS
AC Sherburne

INVENTOR
Rollie B. Fageol.
BY
White Prost & Evans.
his ATTORNEYS

Patented Apr. 27, 1926.

1,582,672

UNITED STATES PATENT OFFICE.

ROLLIE B. FAGEOL, OF OAKLAND, CALIFORNIA.

VEHICLE SPRING SUPPORT.

Application filed September 14, 1920. Serial No. 410,158.

*To all whom it may concern:*

Be it known that I, ROLLIE B. FAGEOL, a citizen of the United States, and a resident of Oakland, county of Alameda, State of California, have invented a certain new and useful Vehicle Spring Support, of which the following is a specification.

This invention relates to vehicle supports, and more particularly to an auxiliary spring structure, and has for its object to provide for resilient connection between main springs and a vehicle frame structure.

A further object of the invention is to provide an auxiliary leaf spring structure between each end of a spring and a vehicle frame.

It is an important object of the present invention to provide a type of auxiliary spring interposed between main springs and a vehicle frame, of such construction as to provide for long life of the parts and secure the desired cushioning of the relatively movable elements.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description, as variations may be adopted within the scope of the invention as set forth in the claims.

In the drawing, Figure 1 is a side elevation of an end portion of a vehicle frame and an associated axle.

Figure 1:
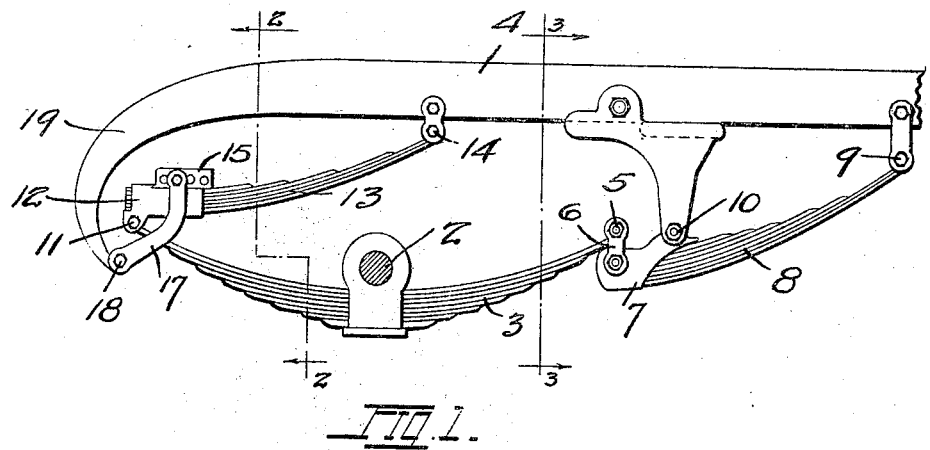
Figure 2:
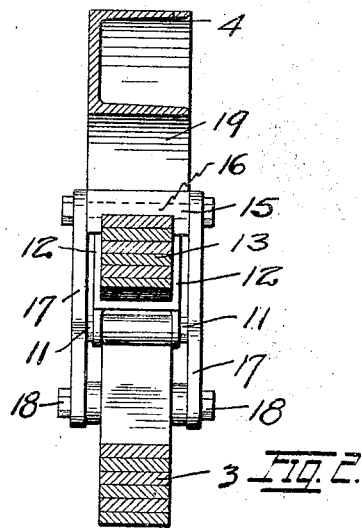
Figure 2 is a cross-section on line 2—2 of Figure 1, looking in the direction of the arrow.
Figure 3:
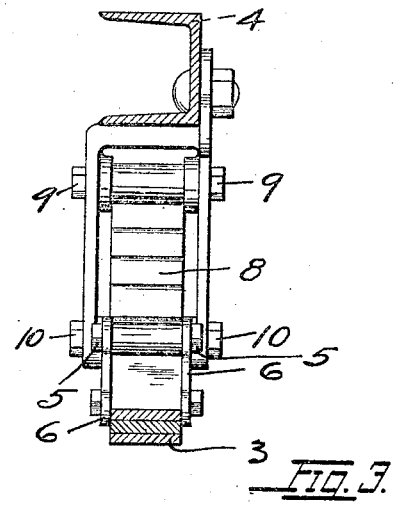
Figure 3 is a cross-section on line 3—3 of Figure 1, looking in the direction of the arrow.

It has been proposed to secure an auxiliary and cushioning spring connection between the ends of part-elliptic springs attached to an axle, and a vehicle frame, but one of the objections of forms of devices that have been utilized is the lack of inherent strength and durability under the actions and loads imposed. To the end of remedying such defect, the present invention consists in leaf or laminated spring devices substantially of cantilever form, each device connected at one end to a vehicle frame and at its opposite end to the contiguous end of a semi-elliptic spring, with intermediate fulcra connecting the auxiliary springs to the frame.

A form of the invention is shown herewith in which an axle 2 is provided with a semi-elliptical leaf spring 3, extending substantially parallel to and below a side component 4 of a vehicle frame. One end of the top leaf of the main spring 3 is pivotally connected at 5 to a shackle 6, which, in turn, is pivotally connected to a holding device shown as a box or housing 7, in which is secured the contiguous ends of a series of spring leaves forming an auxiliary spring 8, the remote end of the auxiliary spring being pivotally connected by suitable means at 9 to the frame 4. The auxiliary or intermediate spring 8 is pivoted at a point 10, between its connections 6 and 9, with the main spring and frame, respectively, so that upon downward movement of the frame, with respect to the springs 3, there is an upward thrust of the shackles 6 on the short end of the cantilever-like spring 8, which movement is against the reaction of the leaves of the spring between the fulcrum 10 and the connection 9; the auxiliary spring is therefore fulcrumed intermediate its ends to the vehicle frame, and the auxiliary spring comprises a lever, one arm of which is flexible, consisting of a multiple leaf spring and the other arm of which is rigid, comprising the box or clamp 7. The auxiliary spring thus comprises a lever having a flexible long arm and a stiff or rigid short arm.

The opposite end of the main spring 3 is pivoted at 11 to a device in the form of a holder or box 12, in which is suitably secured the ends of a set of laminated spring leaves forming another auxiliary spring 13, whose end remote from the box 12 is pivoted to a shackle or other suitable connection 14, attached to the contiguous portion of the frame 4. Intermediate the pivots 11 and 14 of the auxiliary spring 13 is a fulcrum 15 that may consist of a pin or rod adjustable in one or another of a series of transverse pin holes 16, provided in a portion of, or on, the box 12, so that the desired reaction of the cantilever spring 13 may be secured. Connected to the fulcrum 15 is a link device 17 in the form of a pair of side arms, the lower ends of which are pivotally connected at 18 to the horn, or other downwardly bowed portion at 19 adjacent the end of the frame 4.

The reaction of the cantilever spring 13 is similar to the spring 8, in that when the frame 4 moves downwardly, with respect to the spring 3, there is a tendency of the box 12 to move upwardly in a direction reverse to the spring 13 as the latter rocks about its fulcrum 15.

From the above it will be seen that the invention provides a type of auxiliary cushioning springs of a form having great strength and longevity, and which also is of a well known, practicable character of spring, the whole being inexpensively manufactured and applied substantially without reconstruction or alteration of the usual main spring parts and frame construction.

Figure 4:
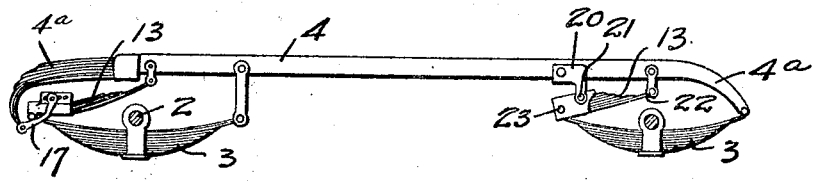
Figure 4 is a diagrammatic view of another form of the invention.

In Fig. 4, the invention is embodied with a frame 4, having main leaf springs 3 at each end, one end only of each of which springs is attached to the main frame, or parts thereon, and one end of each main spring is connected to one end of an interposed cantilever or leaf spring 13. The leaf spring 13 at the front end 4ª of the vehicle frame, is attached by a saddle 20, having a fulcrumed pin 21 on which the leaf or cantilever spring 13 is mounted intermediate its ends. The front end of the leaf spring 13 is attached by a shackle 22 to the front end frame 4ª, while the rear end of the leaf spring 13 is connected at 23 to the rear end of the main frame. The auxiliary spring at the rear end of the frame is mounted substantially as shown in Fig. 1. In some cases the vehicle frame may have a leaf spring portion, as 4ª, Fig. 4, with which the auxiliary spring is combined. It is to be understood that the invention is not limited to the use of two auxiliary springs in connection with one main vehicle spring, as is shown in Fig. 1, but that one auxiliary spring only may be used with each main spring, the auxiliary springs being connected to the main springs preferably at rear ends as shown in Fig. 4.

What is claimed is:

1. The combination with a semi-elliptic main spring and a vehicle frame, of a multiple leaf spring having a flexible portion and a rigid portion fulcrumed to the vehicle frame intermediate the ends of said spring, means connecting the flexible end of the spring to the vehicle frame and means connecting the rigid end of the spring to the end of the main spring.

2. The combination with a semi-elliptic main spring and a vehicle frame, of a multiple leaf spring having a rigid end and a flexible end fulcrumed to the frame intermediate said ends, the flexible end of the spring being connected to the vehicle frame and the rigid end of the spring being connected to the end of the main spring.

3. The combination with a semi-elliptic main spring and a vehicle frame, of a multiple leaf spring having a long flexible arm and a short rigid arm and fulcrumed to said frame intermediate the ends of said spring, the end of the flexible arm being connected to the vehicle frame and the end of the rigid arm being connected to the end of the main spring.

4. An auxiliary vehicle spring comprising a plurality of spring leaves secured together at one end and adapted to be connected at said end to the end of the vehicle main spring, means for attaching the other end of the auxiliary spring to the vehicle frame and a fulcrum member arranged intermediate the ends of the auxiliary spring.

5. An auxiliary vehicle spring comprising a multiple leaf spring of gradually increasing flexibility from a rigid end to a flexible end, adapted to be pivotally connected intermediate its ends to the vehicle frame, means for connecting the flexible end of the spring to the vehicle frame and means for connecting the rigid end of the spring to the end of the main vehicle spring.

6. An auxiliary vehicle spring adapted to be interposed between the vehicle frame and the main vehicle spring, comprising a multiple leaf spring of gradually increasing flexibility from a rigid end to a flexible end, said flexible end being adapted to be connected to the vehicle frame, said rigid end being adapted to be connected to the end of the main spring and said auxiliary spring being adapted to be connected intermediate its ends to the vehicle frame.

7. A device for interposition between a vehicle spring end and a vehicle frame, comprising a lever of gradually increasing flexibility from a rigid end to a flexible end, means for pivotally attaching said lever intermediate its ends to said vehicle frame, means for connecting the flexible end of the lever to the vehicle frame and means for connecting the rigid end of the lever to the end of the vehicle spring.

8. A device for interposition between a vehicle spring end and a vehicle frame comprising a lever of gradually increasing flexibility from a fulcrum connected to the vehicle frame to a free end connected to the vehicle frame and a rigid extension member secured to the fulcrumed end of the lever and extending beyond the fulcrum adapted to be connected to the end of the vehicle spring.

9. A device for interposition between a vehicle spring end and a vehicle frame comprising a multiple leaf spring of gradually increasing flexibility from end to end and a housing secured to the rigid end of the leaf spring provided with means for connection to the vehicle frame and to the vehicle spring end, the flexible end of said spring being connected to the frame.

10. A device for interposition between a vehicle spring end and a vehicle frame comprising a multiple leaf spring of gradually increasing flexibility from end to end, a housing secured to the rigid end of the spring, a fulcrum part on said housing disposed intermediate between the end of the housing and the flexible end of the spring and a fulcrum part on the end of said housing remote from the flexible end of the spring, the flexible end of said spring being connected to the frame.

11. A device for interposition between a vehicle spring end and a vehicle frame comprising a leaf spring of gradually increasing flexibility from a base end to a flexible end, a housing in which the base end of the spring is secured, a link connecting the flexible end of the spring with the vehicle frame, a link connecting the remote end of the housing with the end of the vehicle spring and means pivotally connecting the housing intermediate the links, with the vehicle frame.

12. The combination with a semi-elliptic main spring and a vehicle frame; of a pair of cantilever springs each attached at one end to the frame and at the opposite end to the respective ends of the main spring and having their fulcra attached to the frame.

13. Means for springing vehicles comprising a half elliptic laminar spring connected at its thickest portion to the axle and connected at one end to a chassis, a spring box to which the other end of said spring is connected, said spring box being pivotally mounted to the chassis, and a quarter elliptic laminar spring mounted in the spring box and bearing on a part of the chassis.

14. In a spring suspension, in combination a semielliptic main spring, a quarter elliptic leaf spring, the butt end of which is enclosed in a spring box, a pivotal connection between the vehicle frame and the spring box, a second pivotal connection between the spring box and said main spring, and a connection between the opposite end of said quarter elliptic spring and the vehicle frame.

15. The combination with a semi-elliptic main spring and a vehicle frame, of a multiple leaf spring having a rigid end and a flexible end interposed between the end of the main spring and the vehicle frame, the end of the main spring being connected to the multiple leaf spring adjacent the rigid end thereof and the free end being connected to the frame.

In testimony whereof, I have hereunto set my hand.

ROLLIE B. FAGEOL.